United States Patent [19]

Vanaschen et al.

[11] Patent Number: 5,048,168
[45] Date of Patent: Sep. 17, 1991

[54] CERAMIC TRANSPORT SHAFT WITH METAL END CAP, PARTICULARLY FOR GLASS MELTING FURNACES, WITH HEAT EXPANSION COMPENSATION

[75] Inventors: Luc Vanaschen, Eupen, Belgium; Hans-Werner Kuster, Aachen, Fed. Rep. of Germany; Hubert Havenith, Würselen, Fed. Rep. of Germany; Gerhard Schubert, Herzogenrath, Fed. Rep. of Germany

[73] Assignee: Saint-Gobain Vitrage International, Courbevoie, France

[21] Appl. No.: 553,372

[22] Filed: Jul. 17, 1990

[30] Foreign Application Priority Data

Jul. 22, 1989 [DE] Fed. Rep. of Germany ....... 3924277

[51] Int. Cl.$^5$ .............................................. B21B 31/08
[52] U.S. Cl. ........................................ 29/118; 29/123; 29/129; 29/130
[58] Field of Search ................. 29/129, 118, 123, 130, 29/115

[56] References Cited

U.S. PATENT DOCUMENTS

| 3,867,748 | 2/1975 | Miller | 29/115 |
| 4,230,475 | 10/1980 | Dunk | 29/115 X |
| 4,242,782 | 1/1981 | Hanneken et al. | 29/129 |
| 4,399,598 | 8/1983 | Page et al. | 29/123 X |
| 4,404,011 | 9/1983 | McMaster | 29/123 X |
| 4,751,776 | 6/1988 | Reunamäki | 29/129 |
| 4,793,459 | 12/1988 | Forknall et al. | 29/123 X |
| 4,924,688 | 5/1990 | Cutmore | 29/130 X |

FOREIGN PATENT DOCUMENTS 0217262 8/1987 European Pat. Off. .

Primary Examiner—Timothy V. Eley
Assistant Examiner—C. Richard Martin
Attorney, Agent, or Firm—Oblon, Spivak, McClelland, Maier & Neustadt

[57] ABSTRACT

A ceramic transport shaft for a furnace includes a ceramic shaft member and a metal end cap into which an end of the shaft member is fitted with an annular gap between the shaft member and the end cap. A sleeve fills the gap. The shaft member, the end cap and the sleeve have such linear thermal coefficients of expansion, and the wall of the sleeve has such a radial thickness, that a change in the radial size of the gap due to thermal expansion of the shaft member and the end cap is at least equalled by a change in the radial thickness of the sleeve wall. The sleeve has one or more axial slots to absorb the circumferential expansion thereof during heating.

6 Claims, 1 Drawing Sheet

CERAMIC TRANSPORT SHAFT WITH METAL END CAP, PARTICULARLY FOR GLASS MELTING FURNACES, WITH HEAT EXPANSION COMPENSATION

BACKGROUND OF THE INVENTION

1. Field of the Invention

The invention relates to a ceramic transport shaft, particularly for horizontal continuous melting furnaces for heating glass plates to the bending or tempering temperature.

2. Description of the Related Art

Ceramic transport or conveying shafts such as are, e.g., used in the hot part of roller-type furnaces for heating glass plates to the bending and/or tempering temperature, are in many cases provided with metal end caps used for coupling the transport shafts to a rotary drive mechanism or the rotary mounting of the transport shafts.

The fixing of the end caps to the ceramic transport shafts is problematic, because the shafts are subject to considerable heating during operating and the shaft ends with the end caps reach temperatures of a few hundred degrees C. As the thermal expansion coefficient of the metal forming the end cap is much higher than that of the ceramic material of the transport shafts, the metal cap is enlarged, so that it becomes detached from the shaft end. Therefore, additional measures must be taken to prevent the end cap from becoming detached from the shaft end at elevated temperatures.

U.S. Pat. No. 4,404,011 discloses a transport shaft with a metal end cap, in which the internal diameter of the metal end cap is larger than the external diameter of the shaft end, and in the resulting gap between the shaft end and the end cap are placed a plurality of tensioned leaf springs in such a way that the central area of the leaf springs presses against the circumferential surface of the shaft end, while the end areas of the leaf springs are supported on the inner wall of the end cap. At ambient temperature the pretension of the leaf springs is so high that the necessary compression action can still be exerted by them if there is a radial increase in the size of the gap between the shaft end and the end cap on increasing the temperature. However, there are limits to the use of this solution in that the leaf springs lose their elastic qualities at higher temperatures, so that the end cap fastening can only be used at relatively low temperatures.

SUMMARY OF THE INVENTION

An object of the invention is to provide a fastening for an end cap to the end of a ceramic transport shaft, which ensures a reliable hold of the metal end cap, even at relatively high temperatures at which the known fastening means fail.

According to the invention, this object, and other objects, is achieved by forming a ceramic transport shaft for a furnace with a ceramic shaft member, a metal end cap into which an end of the shaft member is fitted with an annular gap between said shaft member and said end cap, and a sleeve filling the gap. The shaft member, the end cap and the sleeve have such linear coefficients of thermal expansion, and the wall of the sleeve has such a radial thickness, that a change in the radial size of the gap due to thermal expansion of the shaft member and the end cap is at least equalled by a change in the radial thickness of the sleeve wall. Preferably, the linear thermal expansion coefficient of the sleeve is greater than that of the cap.

Preferably the cylindrical sleeve is metal and has several axial slots, so that several sleeve segments are formed. The thermal expansion in the circumferential direction of the sleeve does not lead to an increase in the sleeve diameter due to the presence of the slots, because radial expansion of the sleeve is resisted by the end cap, and consequently the circumferential thermal expansion of the sleeve only leads to a reduction of the width of the slots. However, the radial expansion of the sleeve wall has its full effect. The material and wall thickness of the sleeve must be so selected as a function of the thermal expansion coefficients of the ceramic material used for the transport shaft and the metal used for the end cap, so that the increase in the end cap radius caused by heating is at least matched by the increase in the sleeve wall thickness caused by heating.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
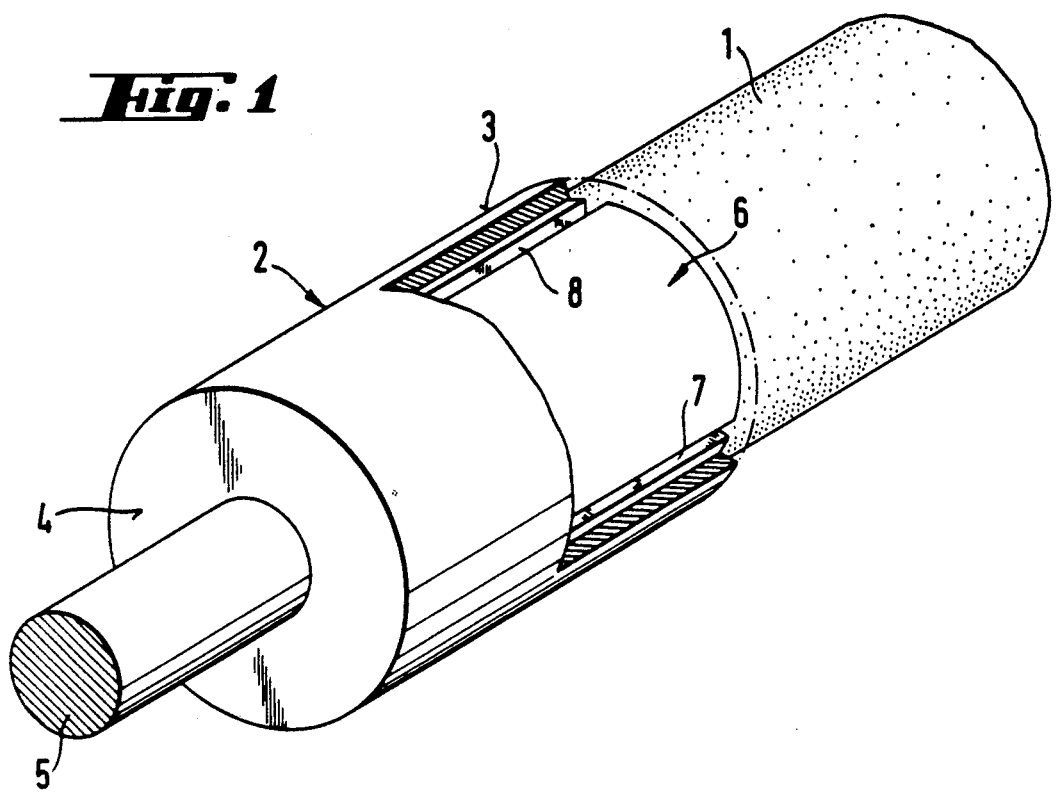
FIG. 1 is a perspective view of an end portion of a ceramic transport shaft with an end cap fixed according to the invention.
Figure 2:
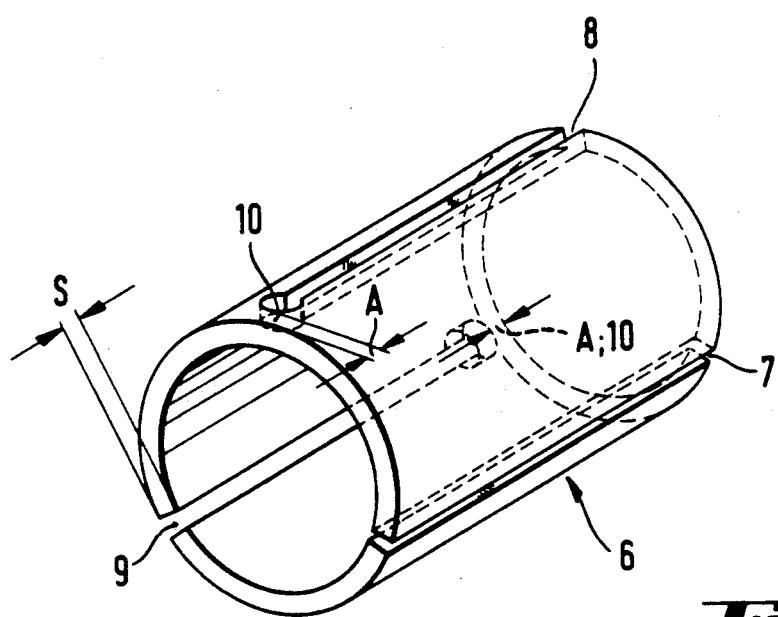
FIG. 2 is a perspective view of a metal sleeve forming the intermediate body between the end cap and the ceramic transport shaft.

The transport shaft member 1 is, e.g., formed from fusion cast or sintered silicon dioxide. It can be constructed as a solid cylindrical body or as a hollow cylindrical, i.e. tubular, body. Instead of being made from an oxide material, it can also be made from some other heat-resistant material, e.g., silicon carbide. When using such transport shafts in a continuous melting furnace for heating glass plates to their bending or tempering temperature, the transport shaft diameter is approximately 5 cm.

The heat-resistant steel end cap 2 is fixed to the shaft end. In the illustrated embodiment the end cap 2 comprises a hollow cylindrical portion 3 and a cover plate 4 which is provided with a central end shaft 5. The latter is, e.g., used for coupling the transport shaft to a suitable drive, which ensures a synchronous rotary movement of all the transport shafts. The end cap may be formed of, for example, a high nickel content steel.

The metal end cap need not necessarily be provided with a cover plate and can instead be a simple hollow metal cylinder. The construction of the end cap as a hollow cylinder is adequate if the transport shaft is mounted (e.g., via bearings) in the vicinity of the end caps, or if the rotary drive of the transport shafts is via a driven belt on which the end caps rest and are rotated by frictional contact.

In the illustrated case the ceramic transport shaft 1 has in the end area enclosed by the end cap 2 the same diameter as in its central portion used for transporting the glass plates. The external diameter of the end cap 2 is therefore larger than the external diameter of the transport shaft 1 by twice the wall thickness of the hollow cylindrical portion 3 and twice the wall thickness of the sleeve 6 interposed in the annular gap between the transport shaft 1 and the end cap 2. The sleeve may be formed of, for example, aluminum, aluminum alloy or chromium-alloyed steel.

Obviously, the invention can also be realized in such a way that the end portion of the transport shaft 1 in the vicinity of the end cap 2 has a smaller diameter than in its central portion and that the end cap 2 has, e.g., the same diameter as the transport shaft in its central portion.

The sleeve 6 interposed between the transport shaft 1 and the hollow cylindrical end cap portion 3 is shaped like a hollow cylinder with a wall thickness S and with axial slots 7, 8 and 9. In this case, the slot 7 extends over the entire length of the sleeve 6. In order to ensure the unity of the sleeve when there are several slots, the other slots 8 and 9 are not through slots and instead end at enlarged portions a short distance A from base face of the sleeve, so that the individual sleeve segments remain interconnected by the web 10 left there. The slots 8 and 9 are constructed in such a way that the remaining web 10 is placed on alternate ends of the sleeve 6.

As has already been stated, the wall thickness S of the sleeve 6 must have a certain value so as to achieve the purpose of the invention, i.e., so that its increase in radial thickness is at least equal to an increase in the thickness of the gap due to thermal expansion. This value is dependant on the diameter of the transport shaft or the transport shaft end surrounded by the end cap and also on the thermal expansion coefficients of the materials of the transport shaft, the end cap and the sleeve. This dependence can be mathematically determined.

If the transport shaft diameter is designated D, the mean linear thermal expansion coefficient of the ceramic material from which the transport shaft is made is designated $\alpha_1$, the mean linear thermal expansion coefficient of the metal from which the end cap is $\alpha_2$ and the mean linear thermal expansion coefficient of the metal from which the intermediate body-forming sleeve is $\alpha_3$, the following dependence should exist between the wall thickness S of the sleeve and said quantities:

$$S = \frac{D}{2} \cdot \frac{\alpha_3 - \alpha_1}{\alpha_2 - \alpha_3}$$

If, e.g., for the diameter 50 mm transport shaft 1 use is made of a silica material with $\alpha_1 = 0.6 \times 10^{-6} \, K^{-1}$, for the end cap a heat-resistant steel with $\alpha_3 = 4 \times 10^{-6} \, K^{-1}$, and for the sleeve aluminum with $\alpha_2 = 23 \times 10^{-6} \, K^{-1}$, then the above formula indicates that the wall thickness of the sleeve should be at least 4.5 mm and preferably exactly 4.5 mm for compensating for the end cap diameter increase resulting from the heat.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A ceramic transport shaft for a furnace, comprising:
   a ceramic shaft member;
   a metal end cap into which an end of said shaft member is fitted with an annular gap between said shaft member and said end cap; and
   a metal sleeve filling said gap, said sleeve having at least one axial slot,
   wherein the linear thermal expansion coefficient of said sleeve is greater than that of said end cap, and wherein said shaft member, said end cap and said sleeve have such linear thermal coefficients of expansion, and the wall of said sleeve has such a radial thickness, that a change in the radial size of said gap due to thermal expansion of said shaft member and said end cap is at least equalled by a change in the radial thickness of said sleeve wall.

2. The shaft of claim 1, wherein said sleeve has at least two axial slots, one of said slots extending over the entire length of said sleeve, and at least one other slot extending over only a portion of the length of said sleeve.

3. The shaft of claim 2, including at least two of said other slots, alternating ones of said other slots extending to mutually opposite axial ends of said sleeve.

4. The shaft of claim 1, wherein said end cap is made from a high nickel content steel with a mean linear thermal expansion coefficient of 2 to $6 \times 10^{-6} \, K^{-1}$.

5. The shaft of claim 4, wherein said sleeve is made from a material from the group consisting of aluminum, aluminum alloy, and chromium-alloyed steel, and has a mean linear thermal expansion coefficient of 10 to $25 \times 10^{-6} \, K^{-1}$.

6. A ceramic transport shaft for a furnace, comprising:
   a ceramic shaft member;
   a metal end cap into which an end of said shaft member is fitted with an annular gap between said shaft member and said end cap; and
   a sleeve filling said gap,
   wherein said shaft member, said end cap and said sleeve have such linear thermal coefficients of expansion, and the wall of said sleeve has such a radial thickness, that a change in the radial size of said gap due to thermal expansion of said shaft member and said end cap is at least equalled by a change in the radial thickness of said sleeve wall,
   wherein the linear thermal expansion coefficient of said sleeve is greater than that of said end cap and wherein:

$$S = \frac{D}{2} \cdot \frac{\alpha_3 - \alpha_1}{\alpha_2 - \alpha_3}$$

where:
   S is the radial thickness of the sleeve wall,
   D is the diameter of said shaft member,
   $\alpha_1$ is the mean linear thermal coefficient of expansion of said shaft member,
   $\alpha_2$ is the mean linear thermal coefficient of expansion of said end cap,
   $\alpha_3$ is the mean linear thermal coefficient of expansion of said sleeve.

* * * * *